July 30, 1935.　　　　J. F. MASSEY　　　　2,009,939
WAVE MOTOR
Filed March 18, 1935　　　3 Sheets-Sheet 1

John F. Massey
INVENTOR
BY Albert E. Dieterich
and Theodore H. Rutley
ATTORNEYS

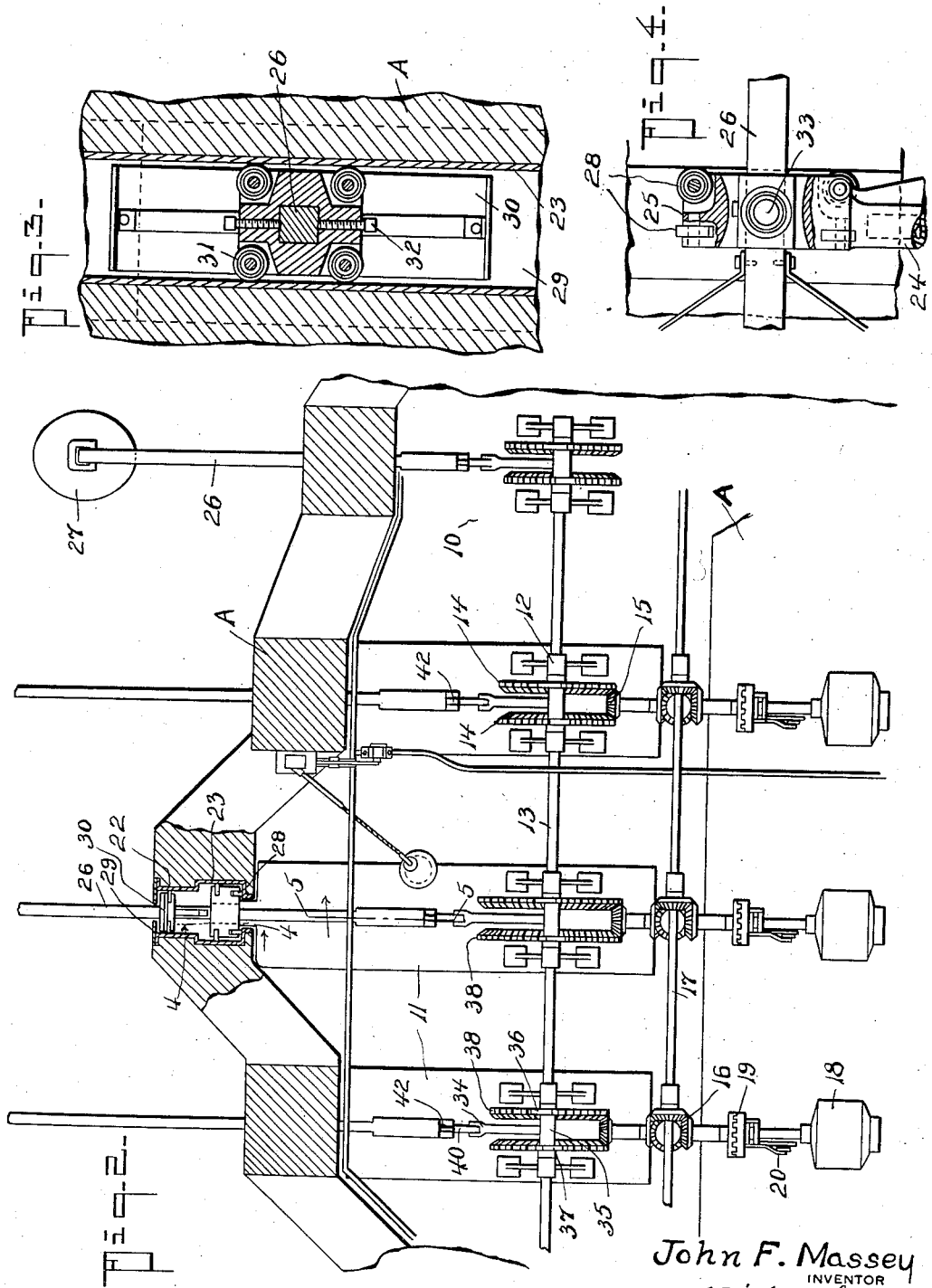

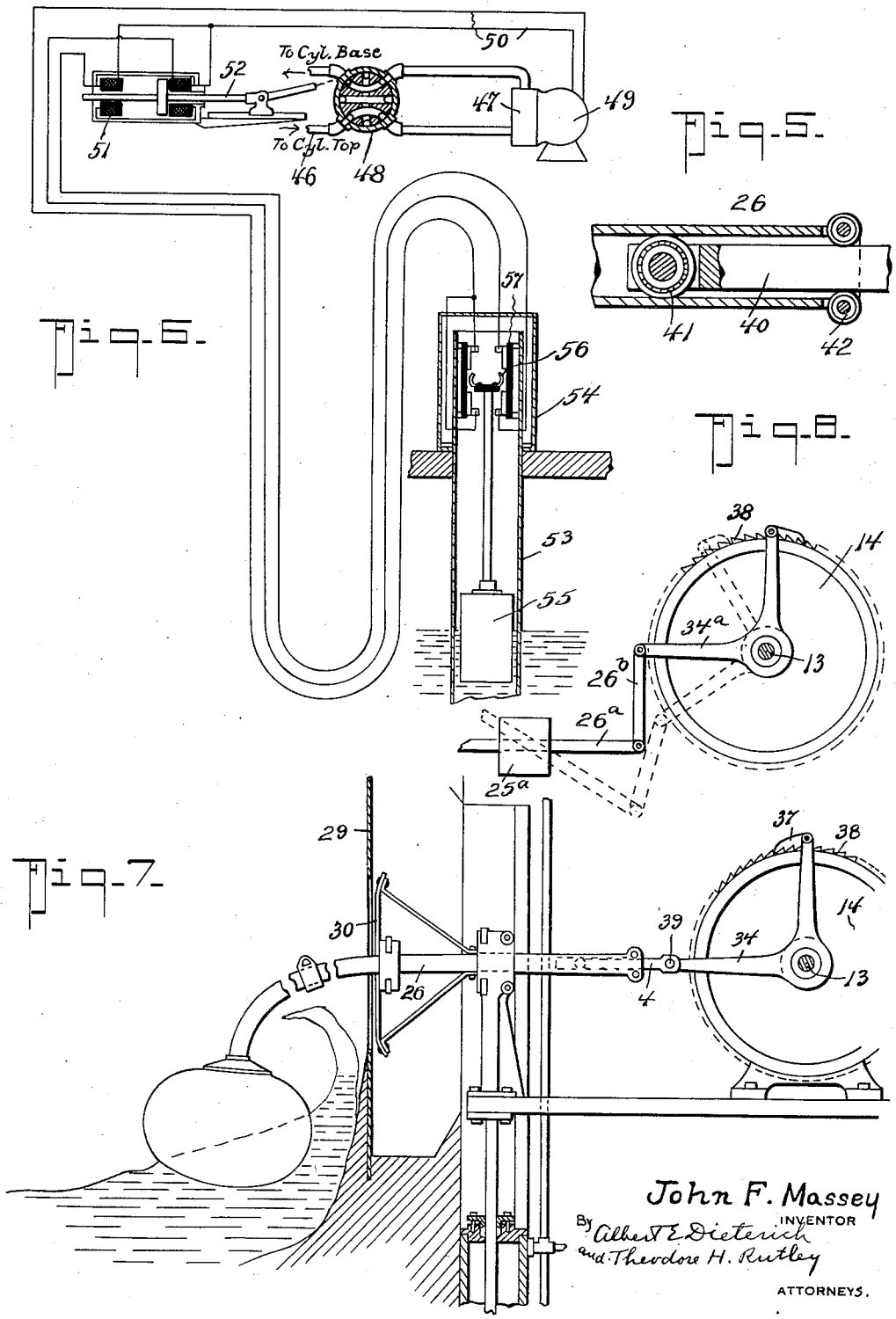

Patented July 30, 1935

2,009,939

UNITED STATES PATENT OFFICE 2,009,939

WAVE MOTOR

John F. Massey, Ventnor, N. J.

Application March 18, 1935, Serial No. 11,712

9 Claims. (Cl. 253—11)

The invention relates to wave motors and more especially to an automatically adjustable gang wave motor.

The primary object of the invention is the provision of a motor of this character, wherein the undulating activity of ocean or sea water can be utilized for imparting motion to machinery or the like to be driven, as for example, electric generators for supplying current to power lines, the motor being of a kind for its operation at low or high tide and such motor being self-adjusting in conformity therewith so that the force of water will be made use of for motive functioning.

Another object of the invention is the provision of a motor of this character, wherein through the instrumentality of a gang of wave operating elements or units maximum power may be had so that the motor will render service for driving purposes and when a turbulent body of water is at low ebb or low tide then there will be required the servicing of one piece of machinery or driving unit so that the full activity of the wave motor will be delivered thereto and maximum power available therefor.

A further object of the invention is the provision of a motor of this character, wherein one, several or all of its wave operated elements or units may be rendered passage or inactive, and the wave force can be converted for the driving of one or several power devices, this being optional with the user of the motor.

A still further object of the invention is the provision of a motor of this character, which is comparatively simple in its construction, thoroughly reliable and efficient in its operation, automatically adjustable accordingly to tide conditions of a body of water, easy of operation, strong, durable and fairly inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the hereunto appended claims.

In the accompanying drawings:

Figure 2 is a fragmentary horizontal sectional view showing a major portion of the mechanism of the wave motor in top plan.

Figure 3 is a fragmentary sectional view on the line 3—3 of Figure 1 looking in the direction of the arrows.

Figure 4 is a sectional view on the line 4—4 of Figure 2 looking in the direction of the arrows.

Figure 5 is a sectional view on the line 5—5 of Figure 2 looking in the direction of the arrows.

Figure 6 is a diagrammatic plan view of a circuit layout of control means for the automatic adjustment of the wave motor.

Figure 7 is a fragmentary vertical sectional view through the motor showing in detail adjuncts thereof.

Figure 8 is a detail view of a modified form or alternative construction of a portion of the invention.

Similar reference characters indicate corresponding parts throughout the several views in the drawings.

Figure 1:
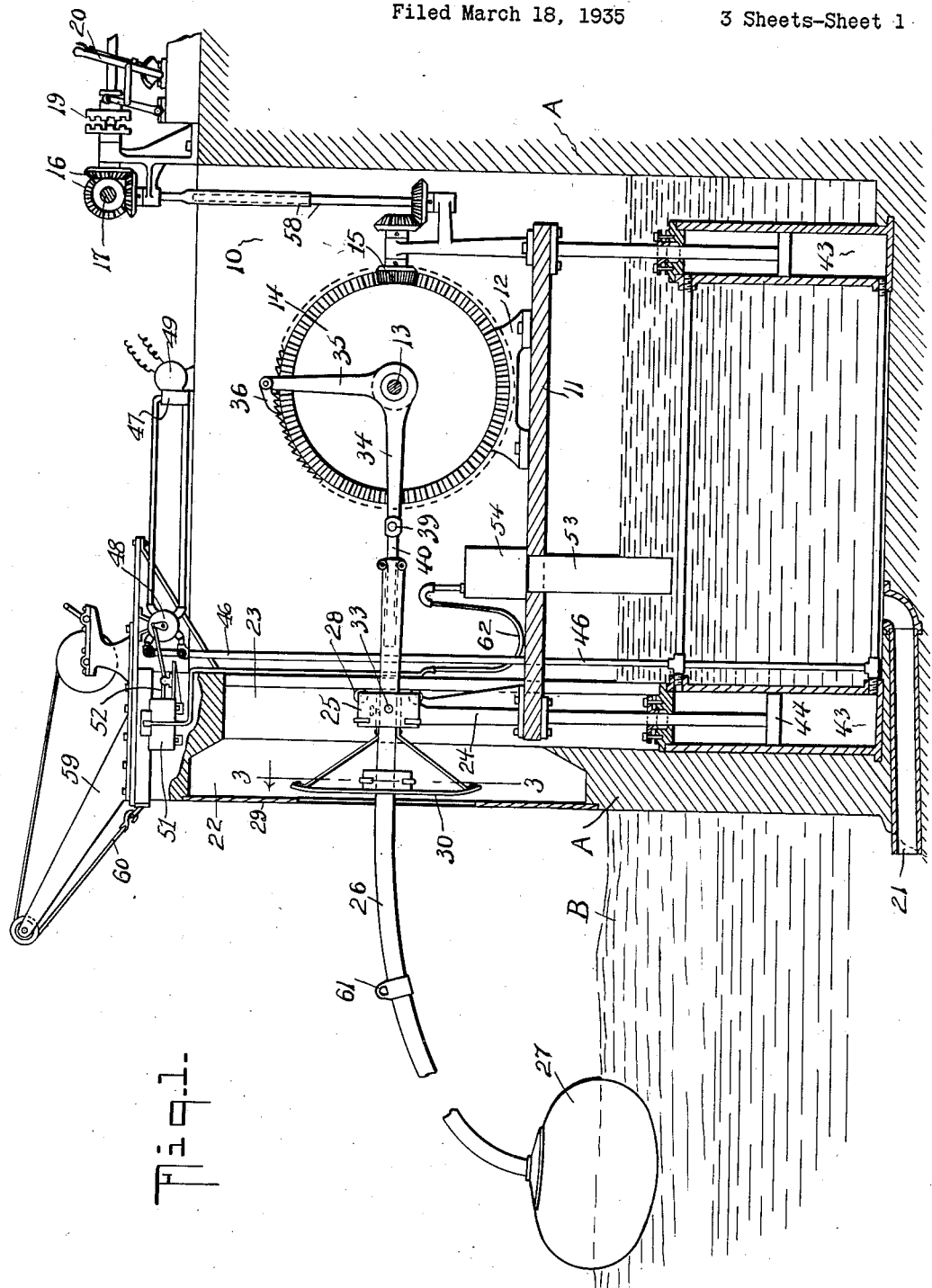
Figure 1 is a fragmentary vertical sectional view through a wall structure confronting a body of water showing the wave motor constructed in accordance with the invention arranged for activity by the body of water.

Referring to the drawings in detail, A designates generally a portion of a wall structure, illustrative of a sea wall confronting a body of water B, exampling an ocean or sea and within this wall is created a well 10 which may be of the required depth for satisfying the successful operation of the wave motor constituting the present invention and hereinafter fully described.

Arranged within the well 10 is a raising and lowering platform 11 having thereon a series of bearings 12 fitted with a driven shaft 13, these bearings in the series being arranged in spaced pairs and between which are located pairs of beveled gears 14, one being movable and the other fixed thereon to said shaft 13 and such gears have meshing engagement with pinions 15, these through gear and shaft connections 16 and 17, respectively, operate power machinery, as for example, electric generators 18. Included in these connections are manually controlled clutches 19 of any approved type so that one or all of the generators 18 may be freed from such connections or one, several or all of said generators rendered active by such connections. The control for each clutch 19 is indicated at 20 and is manually operable.

Leading from the bottom of the well 10 to the body of the water B through the wall A is a communicating conduit 21 the same being of a size to allow water admission into the well from said body of water B to have it of a level approximating the normal level of said body of water B and to eliminate any great disturbance to the water within the well at the surface thereof when the body of water B is turbulent or undulating.

The wall A at the front of the well 10 has provided therein suitable openings 22 above the body of water B while upon the platform 11 for location within a guideway 23 next to a companion opening 22 therefor, as provided in said wall A, is an upright or standard 24 provided with a head 25 in which is pivoted a vertically swinging float arm 26 the same being extended through the opening 22 for a distance away from the wall A and at its outer free end is carried a float 27 which rides the body of water B. The head 25 has fitted therewith suitable anti-friction bearings such as rollers 28 these travelling upon surfaces adjacent thereto of the guideway 23 on the raising and lowering of the platform 11. The opening 22 has fitted thereto a stationary water shield 29 it having an opening or clearance for permitting the vertical swinging of the float arm 26 to the maximum of its movement, while upon this arm 26 is carried a water shutter or shield 30 coactive with the shield 29 and moves with the arm to exclude the spraying or flow of water through the opening 22 into the well 10 on the changing of the position of the arm. The movable shield 30 is equipped with anti-friction bearings such as rollers 31 adapted to travel upon the surfaces adjacent thereto of the opening 22. The shield 30 is adjustably held on the arm 26 through the medium of set screws 32 carried by said shield. The arm 26 is swingingly supported upon a pivot 33 journaled in the head 25 of the standard or upright 24 companion to said arm.

Cooperative with the pairs of gears 14 and mounted for turning upon the shaft 13 are rockers 34 each having double arms 35 pivotally supporting reversely acting ratchet dogs 36 and 37, respectively, these acting with reversely arranged ratchet teeth 38 formed at the peripheries of the respective gears 14 of each pair so that on the swinging of the rocker 34 in reverse directions the shaft 13 will be rotated in one direction. Each rocker 34 has pivoted at 39 thereto a link 40 slidably fitting within the companion float arm 26, this link and the end of the arm 26 accommodating the same and being provided with anti-friction bearings 41 and 42, respectively, of any selected type.

In Figure 8 I have illustrated an alternative connection between the float arm and the rocker. By reference to Figure 8 it will be seen that the float arm 26a is connected to the rocker 34a by a link 26b. With this arrangement I avoid any danger of the connection between the arm and the rocker becoming broken due to a sudden impact of the waves on the floats 27. Now it will be noted that when movement is imparted to the arms 26 the rockers 34 will be arcuately shifted for a continuity of driving action on the gears 14 so that the shaft 13 will have motion in one direction.

Located in the bottom of the well 10 are suitable fluid operated jacks each including a cylinder 43 vertically arranged and stationarily held and within which works a piston 44, its stem 45 working through the upper end of said cylinder and made fast to the under side of the platform 11. When fluid is admitted to either side of the piston 44 the jack will be operated for the raising and lowering of the platform 11. These cylinders 43 through a system of piping 46 are charged with and have exhausted therefrom a fluid, such as oil, controlled by a pump 47 included in said piping system while built with the system is a valve 48 the latter regulating the admission and exhaust of fluid to and from the respective cylinders 43 alternately at opposite sides of the piston 44 therein for the successful operation of the jacks. The pump 47 is driven by an electric motor 49 arranged in an electric circuit 50 which also includes solenoids 51 for controlling a throw device 52 for the valve 48 to regulate the same for the admission and exhaust of fluid to and from the cylinders 43 for the operation of the jacks to raise and lower the platform 11.

Carried by the platform 11 is a float barrel 53 having a switch box 54 closing the top of said barrel while the bottom of the barrel is open and depends from the platform 11 into the water contained within the well 10 so that a float 55 within this barrel 53 will ride the water within the well 10, the float 55 being connected with a movable switch blade 56 of a switch 57 within the circuit 50 for the opening and closing of the latter. This switch 57 is of a type that when the blade 56 thereof is in a low position a circuit will be closed to one of the solenoids 57 for energizing it and in an elevated position will close the circuit to the other solenoid for energizing the same so that in this manner the valve 48 will be controlled for regulating the working of the jacks for the automatic raising and lowering of the platform 11. The blade 56 of the switch 57 when in a neutral position opens the circuit 50 so that both solenoids will be de-energized and the motor 49 at a standstill.

When the body of water B is at ebb or low tide the water within the well 10 lowers and it becomes necessary to have the platform 11 at a proper position so that the wave floats 27 will function by wave action. Therefore, by the lowering of the water within the well 10 the switch blade 56 will be carried to low position instantly energizing the proper solenoid 51 and simultaneously therewith causing the operation of the pump 49 so that the valve 48 within the piping system will be charged to regulate the flow of fluid into the jacks causing the platform 11 to become lowered within the well 10 and the instant that this platform arrives at the proper position the switch 57 will be opened and thereby stopping the motor 49 and the valve 48 will remain in its adjusted position thus holding the jacks against operation until the tide changes and concurrently therewith the water contained within the well 10 whereupon the jacks will again be automatically operated for the proper positioning of the platform 11 within the well 10 so that the wave floats 27 will operate by wave activity of the water B with full force and effect.

The shaft connections 17 have included therewith the extensible and contractible connections 58 for permitting the raising and lowering of the platform 11 without interference in the operation of the wave motor.

Upon the top of the wall A above each of the arms 26 is a hoisting crane 59 having a block and fall or tackle rigging 60 for attachment to a lift collar 61 upon the arm 26 so that the latter can be raised or lowered with respect to the body of water B and when in fully raised position the float 27 will be clear of the water and this particular arm 26 rendered inactive by wave activity.

The float 55 coacting with the water within the well 10 controls the switch 57 for the automatic operation of the wave motor to regulate the raising and lowering of the platform 11 which becomes necessary due to tide changes in the body of water B. The barrel 53 for the float 55 affords a guide for the latter and avoids any possibility of disalignment resultant from water disturbance within the well 10. The circuit wires of the circuit 50 are suitably housed within a flexible conduit 62.

The force of the waves on undulation of the body of water B operates the wave motor so that the latter may be utilized for driving purposes and such wave motor is operative irrespective of tide changes or the level of the water in the well 10.

What I claim is:

1. A wave motor, comprising a raising and lowering platform, fluid operated jacks supporting the said platform, power transmission mechanism carried by said platform, a water wave float actuating the said mechanism and means controlled by a water level for the automatic working of the jacks for the raising and lowering of the platform to position the wave float correspondingly to tide changes.

2. A wave motor, comprising a raising and lowering platform, fluid operated jacks supporting the said platform, power transmission mechanism carried by said platform, a water wave float actuating the said mechanism, means controlled by a water level for the automatic working of the jacks for the raising and lowering of the platform to position the wave float correspondingly to tide changes, a well for the platform and having an opening for the connection of the wave float with the said mechanism and a shield coacting with the connection of the wave float with the said mechanism and regulating the opening from the well.

3. A wave motor, comprising a raising and lowering platform, fluid operated jacks supporting the said platform, power transmission mechanism carried by said platform, a water wave float actuating the said mechanism, means controlled by a water level for the automatic working of the jacks for the raising and lowering of the platform to position the wave float correspondingly to tide changes, a well for the platform and having an opening for the connection of the wave float with the said mechanism, a shield coacting with the connection of the wave float with the said mechanism and regulating the opening from the well and means for connecting and disconnecting the power transmission mechanism with a part to be operated thereby.

4. A wave motor, comprising a raising and lowering platform, fluid operated jacks supporting the said platform, power transmission mechanism carried by said platform, a water wave float actuating the said mechanism, means controlled by a water level for the automatic working of the jacks for the raising and lowering of the platform to position the wave float correspondingly to tide changes, a well for the platform and having an opening for the connection of the wave float with the said mechanism, a shield coacting with the connection of the wave float with the said mechanism and regulating the opening from the well, means for connecting and disconnecting the power transmission mechanism with a part to be operated thereby and a fluid flow control valve included in the first-named means for regulating the fluid flow to the said jacks.

5. A wave motor, comprising a raising and lowering platform, fluid operated jacks supporting the said platform, power transmission mechanism carried by said platform, a water wave float actuating the said mechanism, means controlled by a water level for the automatic working of the jacks for the raising and lowering of the platform to position the wave float correspondingly to tide changes, a well for the platform and having an opening for the connection of the wave float with the said mechanism, a shield coacting with the connection of the wave float with the said mechanism and regulating the opening from the well, means for connecting and disconnecting the power transmission with a part to be operated thereby, a fluid flow control valve included in the first-named means for regulating the fluid flow to the said jacks and guide means for the connection between the wave float and said power transmission mechanism.

6. A wave motor, comprising a raising and lowering platform, fluid operated jacks supporting the said platform, power transmission mechanism carried by said platform, a water wave float actuating the said mechanism, means controlled by a water level for the automatic working of the jacks for the raising and lowering of the platform to position the wave float correspondingly to tide changes, a well for the platform and having an opening for the connection of the wave float with the said mechanism, a shield coacting with the connection of the wave float with the said mechanism and regulating the opening from the well, means for connecting and disconnecting the power transmission mechanism with a part to be operated thereby, a fluid flow control valve included in the first-named means for regulating the fluid flow to the said jacks, guide means for the connection between the wave float and said power transmission mechanism and means for raising and lowering the wave float.

7. A wave motor, comprising a raising and lowering platform, fluid operated jacks supporting the said platform, power transmission mechanism carried by said platform, water wave floats actuating the said mechanism and means controlled by a water level for the automatic working of the jacks for the raising and lowering of the platform to position the wave floats correspondingly to tide changes.

8. A wave motor, comprising a raising and lowering platform, fluid operated jacks supporting said platform, power transmission mechanism carried by said platform, water wave floats actuating the said mechanism, means controlled by a water level for automatically actuating the jacks to raise and lower the platform to position the wave float correspondingly to tide changes, a series of stationarily mounted power generators and power transmitting connections between said generators and said power transmission mechanism that is carried by said platform, said power transmitting connections including stationary elements telescopically connected with movable elements on said water wave floats.

9. A wave motor, comprising a raising and lowering platform, fluid operated jacks supporting the said platform, power transmission mechanism carried by said platform, water wave floats actuating the said mechanism, means controlled by a water level for the automatic working of the jacks for the raising and lowering of the platform to position the wave floats correspondingly to tide changes, a well for the platform and having an opening for the connection of the wave floats with the said mechanism and a shield coacting with the connection of the wave floats with the said mechanism and regulating the opening from the well.

JOHN F. MASSEY.